(12) United States Patent
Han

(10) Patent No.: US 9,450,217 B2
(45) Date of Patent: Sep. 20, 2016

(54) POUCH BATTERY AND MANUFACTURING METHOD THEREOF

(71) Applicant: SAMSUNG SDI CO., LTD., Yongin-si, Gyeonggi-do (KR)

(72) Inventor: Suhee Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 342 days.

(21) Appl. No.: 14/092,808

(22) Filed: Nov. 27, 2013

(65) Prior Publication Data

US 2015/0024263 A1 Jan. 22, 2015

(30) Foreign Application Priority Data

Jul. 19, 2013 (KR) .................. 10-2013-0085579

(51) Int. Cl.
*H01M 2/08* (2006.01)
*H01M 10/04* (2006.01)
*H01M 2/02* (2006.01)

(52) U.S. Cl.
CPC ............ *H01M 2/08* (2013.01); *H01M 2/0212* (2013.01); *H01M 10/0436* (2013.01); *Y10T 29/4911* (2015.01)

(58) Field of Classification Search
CPC ............................ H01M 10/0436; H01M 2/08
USPC ........................................ 429/185; 29/623.2
See application file for complete search history.

(56) References Cited

U.S. PATENT DOCUMENTS 3,703,417 A * 11/1972 Rosa ...................... H01B 3/002
429/139
2006/0240326 A1* 10/2006 Lee ........................ C08G 63/21
429/306
2011/0159328 A1* 6/2011 Yeo ..................... H01M 2/0212
429/94

FOREIGN PATENT DOCUMENTS

| JP | 2004-31104 A | 1/2004 |
| JP | 4793367 | 8/2011 |
| KR | 2000-0035752 | 6/2000 |
| KR | 2002-0025896 | 4/2002 |

OTHER PUBLICATIONS

Patent Abstracts of Japan and Full English Translation, Publication No. 2009-094015, dated Apr. 30, 2009, for JP 4793367, 15 pages.

* cited by examiner

*Primary Examiner* — Cynthia H Kelly
*Assistant Examiner* — Monique Wills
(74) *Attorney, Agent, or Firm* — Lewis Roca Rothgerber Christie LLP

(57) ABSTRACT

A pouch battery including an electrode assembly, and a pouch case comprising a receiving part accommodating the electrode assembly, wherein corners or vertices of the receiving part are coated with a UV curing agent.

15 Claims, 14 Drawing Sheets

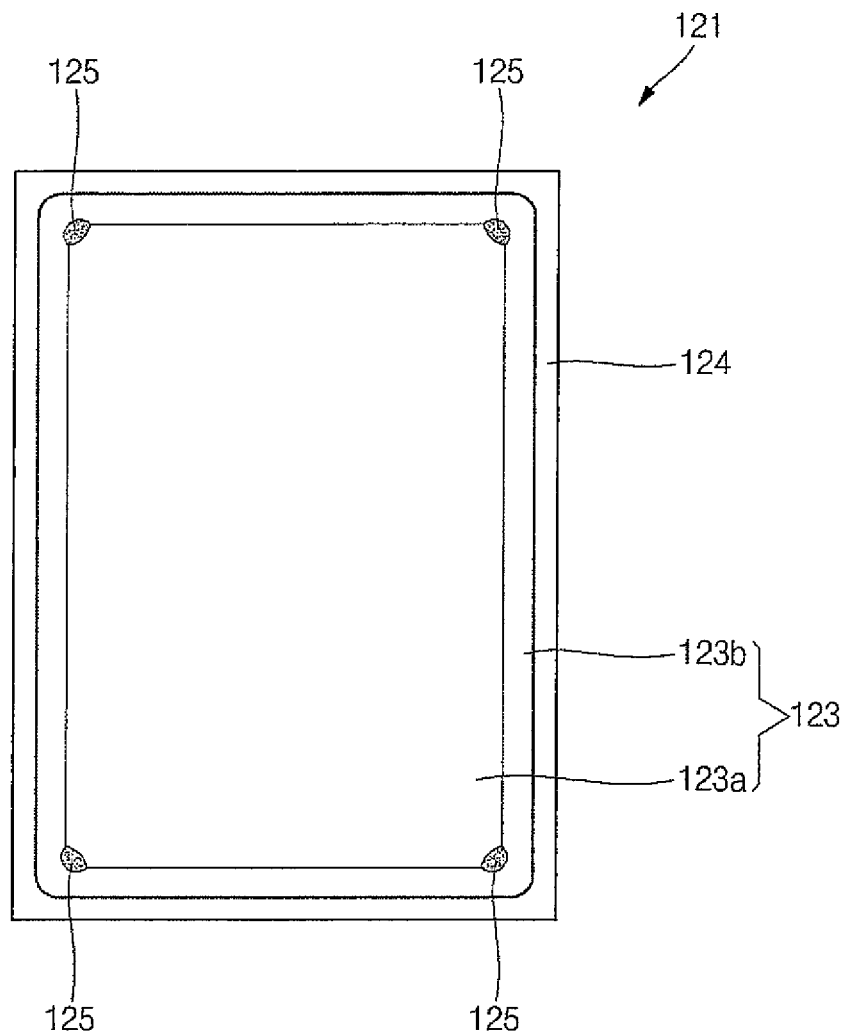

POUCH BATTERY AND MANUFACTURING METHOD THEREOF

CROSS-REFERENCE TO RELATED APPLICATION

This application claims priority to and the benefit of Korean Patent Application No. 10-2013-0085579, filed on Jul. 19, 2013, in the Korean Intellectual Property Office, the entire content of which is incorporated herein by reference.

BACKGROUND

1. Field

Aspects of the present invention relate to a pouch battery and a manufacturing method thereof.

2. Description of the Related Art

In general, unlike primary batteries, which are not desired to be rechargeable, rechargeable secondary batteries are repeatedly chargeable and dischargeable. Low capacity batteries that use single battery cells are used as power sources for various portable small-sized electronic devices such as cellular phones, and camcorders. High power batteries that use tens of battery cells connected to each other in a battery pack are used as power sources for electric scooters, hybrid vehicles, electric vehicles or the like.

The rechargeable battery may be manufactured in various shapes. Generally, a pouch battery includes an electrode assembly having a positive plate and a negative plate and a separator as an insulator interposed therebetween and a thin flexible pouch including the electrode assembly. Here, the pouch receives the electrode assembly in its internal space provided by bonding its edges.

The pouch may be formed by providing an internal space to receive the electrode assembly by applying pressure to a thin flexible pouch film (pressing process). In some instances, a portion of the thin pouch film subjected to severe stress may crack. When cracks are generated in the pouch, the interior parts of the pouch battery may not be completely sealed, such that moisture may penetrate into the pouch battery, or an electrolytic solution contained in the pouch battery may leak, thereby lowering safety of the pouch battery.

SUMMARY

Aspects of embodiments according to the present invention are directed to a pouch battery and a manufacturing method thereof capable of improving the safety of the battery by preventing moisture from infiltrating into the battery and preventing an electrolytic solution from leaking out, using an ultraviolet (UV) curing agent coated to cover vertices or corners (e.g., edges) of a receiving part of a pouch body, which are prone to (e.g., highly liable to) crack during a pressing process. Further, aspects of embodiments according to the present invention are capable of sealing interior parts of a pouch case even when cracks are generated at corners of the pouch body in a formation process.

In accordance with one aspect of the present invention, there is provided a pouch battery including: an electrode assembly; and a pouch case including a receiving part accommodating the electrode assembly, wherein corners or vertices of the receiving part may be coated with a UV curing agent.

The pouch case may include: a pouch body including the receiving part accommodating the electrode assembly therein and having one open side; and a pouch cover having a generally plate shape and coupled to one side of the pouch body to cover the receiving part of the pouch body.

The UV curing agent may be coated on inner corners of the receiving part.

The UV curing agent may be coated on outer corners of the receiving part.

The UV curing agent may be coated on outer vertices of the receiving part.

The pouch body includes the receiving part and a planar part, the receiving part having a bottom part that may be a rectangular planar plate and lateral parts extending from corners of the bottom part in a direction generally perpendicular to the bottom part, and the planar part being bent from the lateral parts of the receiving part and extends outward from the receiving part in parallel with the bottom part.

The UV curing agent may be coated on vertices of the bottom part inside the receiving part.

The pouch case may be configured such that the planar part of the pouch body and the pouch cover are bonded to each other, and positive and negative electrode tabs of the electrode assembly are exposed to the outside.

In accordance with another aspect of the present invention, there is provided a manufacturing method of a pouch battery, the manufacturing method including: forming a pouch case by forming a receiving part that is a groove formed in a rectangular pouch film by a pressing process; coating a UV curing agent on corners or vertices of the receiving part; mounting an electrode assembly in the receiving part of the pouch case; and sealing the pouch case accommodating the electrode assembly.

In the coating of the UV curing agent, the UV curing agent may be coated on inner corners of the receiving part.

In the coating of the UV curing agent, the UV curing agent may be coated on outer corners of the receiving part.

In the coating of the UV curing agent, the UV curing agent may be coated on inner vertices of the receiving part.

In the coating of the UV curing agent, the UV curing agent may be coated on outer vertices of the receiving part.

The pouch case includes: a pouch body including the receiving part and a planar part, the receiving part having a bottom part that is a rectangular planar plate and lateral parts extending from corners of the bottom part in a direction generally perpendicular to the bottom part, and the planar part being bent from the lateral parts of the receiving part and extending outward from the receiving part in parallel with the bottom part; and a pouch cover having a generally plate shape and coupled to one side of the pouch body to cover the receiving part of the pouch body.

In accordance with another aspect of the present invention, there is provided a manufacturing method of a pouch battery, the manufacturing method including: forming a pouch case by forming a receiving part that is a groove formed in a rectangular pouch film by a pressing process; mounting an electrode assembly in the receiving part of the pouch case; sealing the pouch case accommodating the electrode assembly; and coating a UV curing agent on outer corners or vertices of the receiving part.

As described above, in the pouch battery and the manufacturing method thereof, according to the embodiments of present invention, the safety of the pouch battery can be improved by preventing moisture from infiltrating into the battery and preventing an electrolytic solution from leaking out, using an ultraviolet (UV) curing agent coated to cover vertices or corners (e.g., edges) of a receiving part of a pouch body, which are prone to (e.g., highly liable to) crack during a pressing process. Further, embodiments of the present invention are capable of sealing a pouch case even when cracks are generated at corners of the pouch body in a formation process.

Additional aspects and/or features of the present invention will be set forth in part in the description which follows and, in part, will be obvious from the description, or may be learned by practice of the invention.

BRIEF DESCRIPTION OF THE DRAWINGS

The features and aspects of the present invention will be more apparent from the following detailed description in conjunction with the accompanying drawings, in which:

FIGS. 2A and 2B are a perspective view illustrating only a pouch case and a plan view illustrating a pouch body of the pouch battery shown in FIG. 1B, according to an example embodiment of the present invention;

DETAILED DESCRIPTION

Figure 1A:
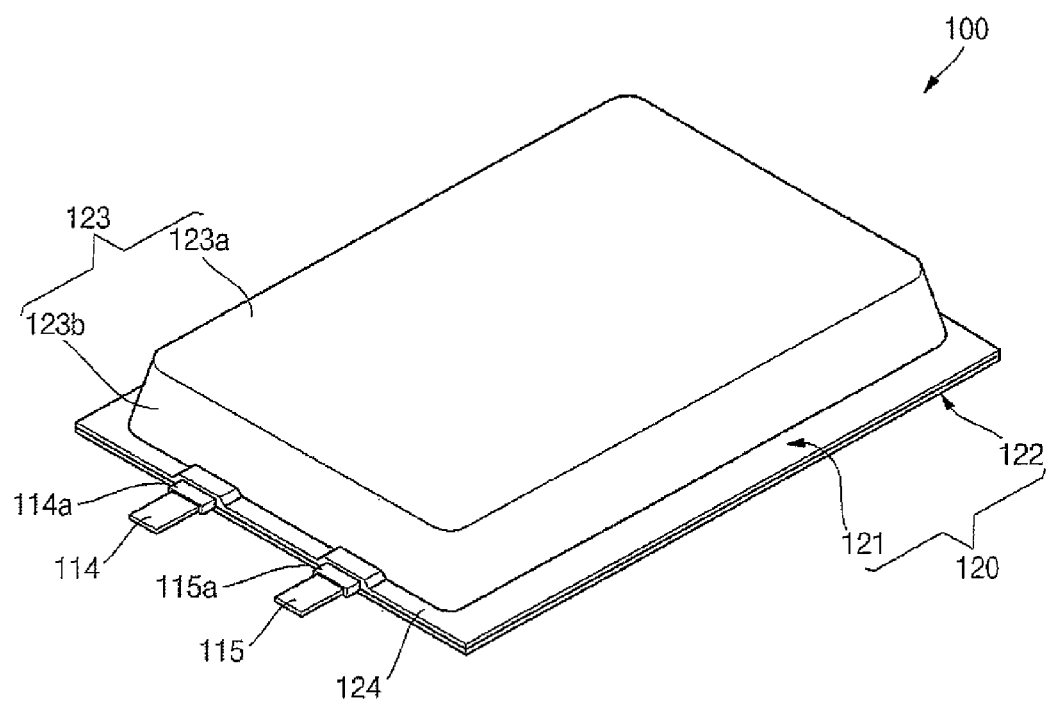
FIGS. 1A and 1B are a perspective view of a pouch battery and an exploded perspective view thereof viewed from a different side, according to an example embodiment of the present invention.

Example embodiments of the present invention will now be described in more detail with reference to accompanying drawings, such that those skilled in the art can easily practice the present invention. Here, like reference numerals refer to like elements throughout.

Figure 1B:
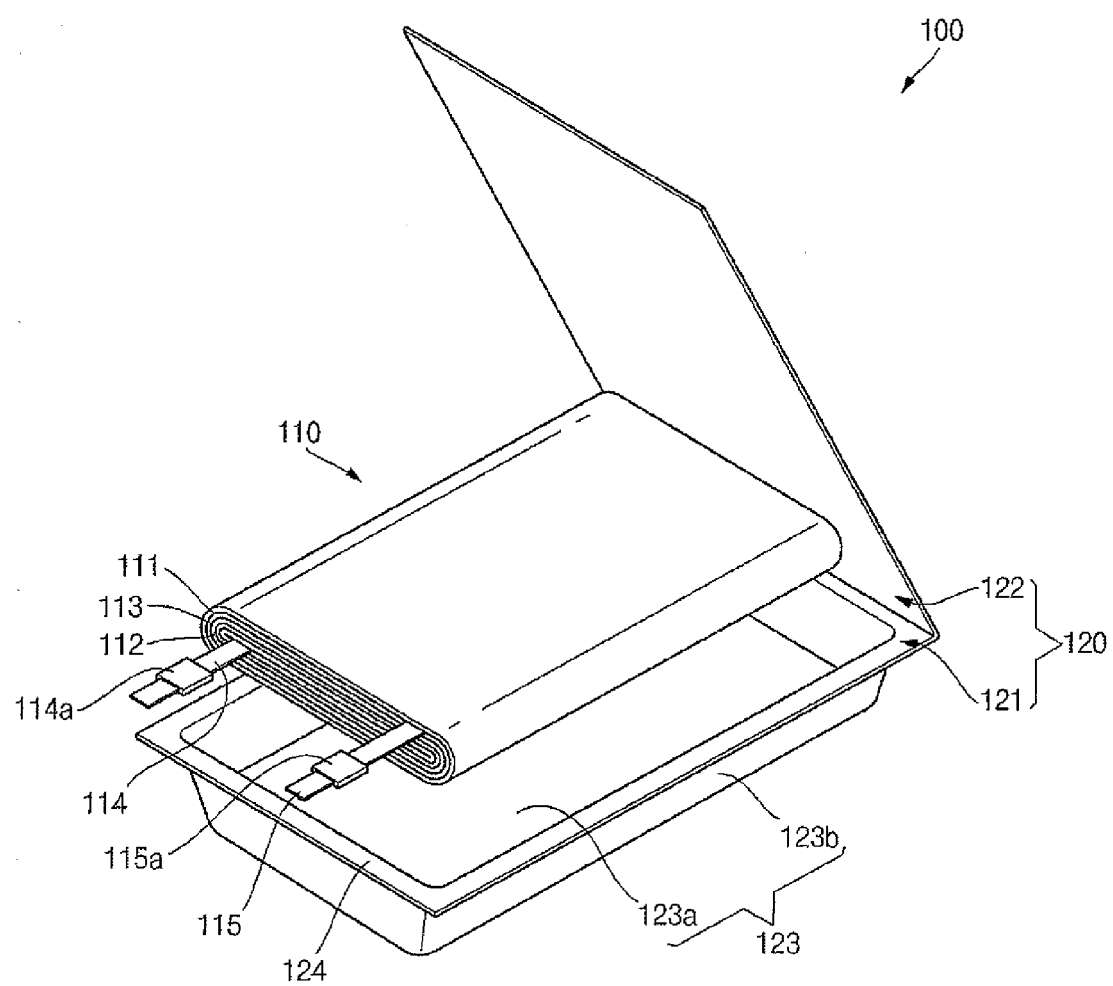

FIGS. 1A and 1B are a perspective view of a pouch battery and an exploded perspective view thereof viewed from a different side, according to an example embodiment of the present invention.

As shown in FIGS. 1A and 1B, the pouch battery 100 includes an electrode assembly 110 and a pouch case 120. The pouch case 120 includes a pouch body 121 in which the electrode assembly 110 is accommodated (e.g., received), and a pouch cover 122 coupled to the pouch body 121. FIG. 1A is a perspective view of the pouch battery 100, viewed from a side of the pouch body 121 of the pouch case 120, and FIG. 1B is an exploded perspective view of the pouch battery 100, viewed from a side of the pouch cover 122 of the pouch case 120, as opposed to a direction in which the pouch battery 100 is viewed from the side of the pouch body 121.

Figure 2A:
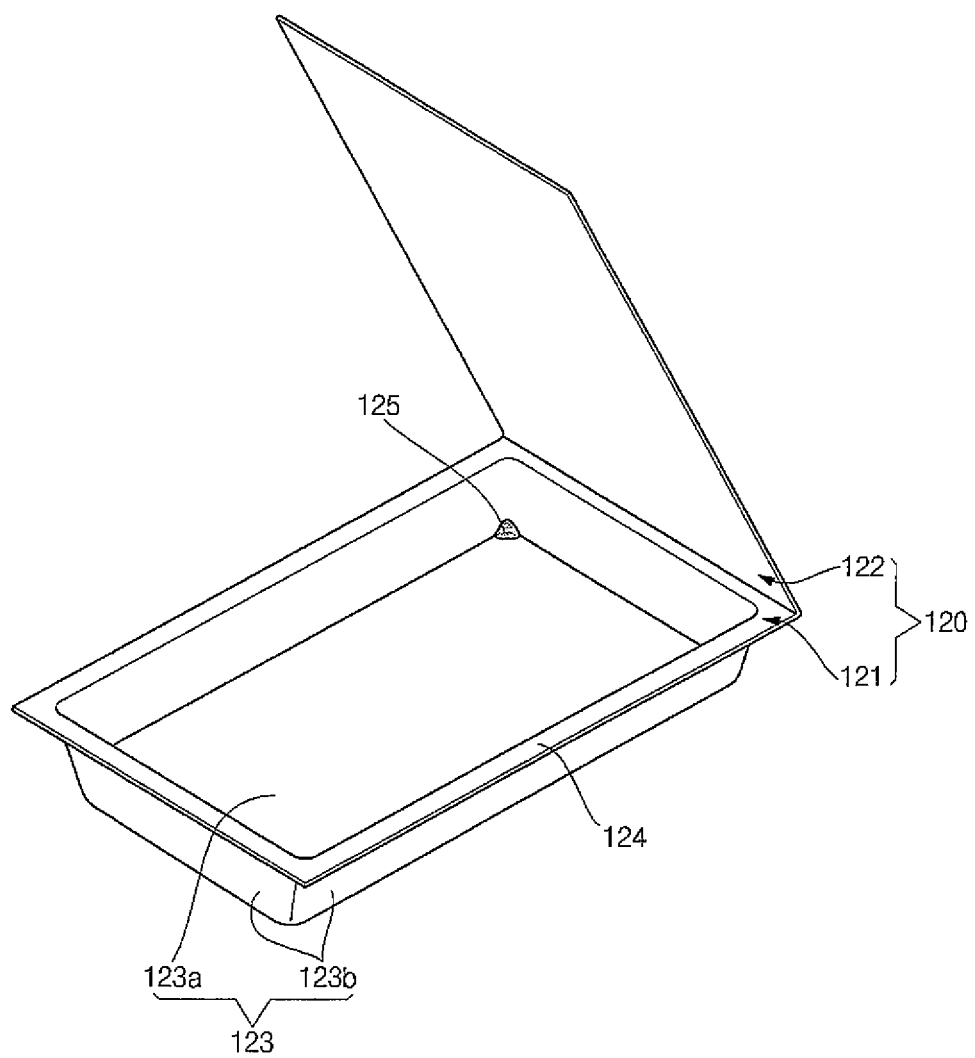

FIG. 2A is a perspective view illustrating the pouch case 120 shown in FIG. 1B, and FIG. 2B is a plan view illustrating the pouch body 121 in the pouch case 120 shown in FIG. 2A, according to an example embodiment of the present invention. Hereinafter, a configuration of the pouch battery 100 will be described with reference to FIGS. 1A, 1B, 2A and 2B.

The electrode assembly 110 is formed by winding or laminating a stacked structure of a first electrode 111, a separator 113 and a second electrode 112, which are formed of thin plates or layers. The first electrode 111 may function as a positive electrode, and the second electrode 112 may function as a negative electrode, or vice versa. The electrode assembly 110 is received in the pouch case 120.

The first electrode 111 is formed by applying a first active material, such as a transition metal oxide, to a first current collector of a metal foil, such as aluminum, however, the present invention does not limit the material of the first electrode 111, and any suitable material known to those skilled in the art may be used.

The second electrode 112 is formed by applying a second active material, such as graphite or carbon, to a second electrode collector plate made of a metal foil, such as copper or nickel, however, the present invention does not limit the material of the second electrode 112, and any suitable material known to those skilled in the art may be used.

The separator 113 may be interposed between the first electrode 111 and the second electrode 112 for preventing a short-circuit therebetween and for allowing movement of lithium ions. The separator 113 may be formed of, for example, polyethylene (PE), polypropylene (PP), a composite film of PE and PP, and/or the like. However, the material of the separator 113 is not limited thereto.

The first electrode plate 111 and the second electrode plate 112 may be electrically coupled to (e.g., electrically connected to) the first electrode tab 114 and the second electrode tab 115, respectively.

The electrode assembly 110 is accommodated (e.g., received) in the pouch case 120 with an electrolytic solution. The electrolytic solution may include an organic solvent, such as ethylene carbonate (EC), propylene carbonate (PC), diethyl carbonate (DEC), ethyl methyl carbonate (EMC), dimethyl carbonate (DMC), and a lithium salt, such as $LiPF_6$ or $LiBF_4$, and/or the like. The electrolytic solution may be a liquid, solid, and/or gel electrolyte.

The first electrode tab 114 is electrically coupled to (e.g., electrically connected to) the first electrode 111 of the electrode assembly 110. The first electrode tab 114 extends outward and protrudes through the planar part 124 provided in the pouch case 120. The planar part 124 will later be described in detail. In one embodiment, the first electrode tab 114 further includes a first insulation tape 114a provided inside the planar part 124 to surround the first electrode tab 114. The first insulation tape 114a may prevent an electrical short-circuit from occurring between the metal layer of the pouch case 120 and the first electrode tab 114. The first electrode tab 114 may be made of, for example, aluminum or an aluminum alloy. However, the material of the first electrode tab 114 is not limited thereto.

The second electrode tab 115 is electrically coupled to the second electrode 112 of the electrode assembly 110. The second electrode tab 115 extends outward and protrudes through the planar part 124 provided in the pouch case 120. In one embodiment, the second electrode tab 115 further includes a second insulation tape 115a provided inside the planar part 124 to surround the second electrode tab 115. The second insulation tape 115a may prevent an electrical short-circuit from occurring between the metal layer of the pouch case 120 and the second electrode tab 115.

The first electrode tab 114 and the second electrode tab 115 are formed as (e.g., shaped of) planar plates, and may protrude outward and extend from the pouch case 120 through the planar part 124 formed in front of the pouch case 120 and be parallel to each other. The first electrode tab 114 and the second electrode tab 115 exposed to the outside of the pouch case 120 may be electrically coupled to a protection circuit device and a substrate installed to ensure the safety of the pouch battery 100.

The pouch case 120 may include a pouch body 121 and a pouch cover 122, which are formed by folding a rectangular pouch film formed as a single body along a lengthwise direction of one side of the rectangular pouch film. In an embodiment, the pouch case 120 also includes separate pouch films, rather than a single body pouch film, where folded parts of the pouch body 121 and the pouch cover 122 are separated from each other.

The pouch body 121 includes a receiving part 123 that is a groove to receive the electrode assembly 110. The receiving part 123 may be formed by a pressing process in which a pressure is applied to the rectangular pouch film using a mold shaped to correspond to the receiving part 123. The receiving part 123 includes a bottom part 123a that is a planar plate, and a lateral part 123b formed as a single body and extending a height (e.g., a predetermined height) in a direction generally perpendicular to the bottom part 123a from four corners (e.g., edges) of the bottom part 123a. Thus, the receiving part 123 roughly has a hexahedral shape having one side facing the bottom part 123a opened.

In addition, the pouch body 121 may further include a planar part 124 bent at an edge (e.g., an end) of the lateral part 123b and extending along edges of the receiving part 123 in parallel to the bottom part 123a.

The pouch body 121 further includes a UV curing agent 125 coated on four inner vertices of the bottom part 123a of the receiving part 123. The UV curing agent 125 is coated for the purpose of preventing an electrolytic solution from leaking from the pouch battery 100 due to cracks generated by the stress applied during the pressing process. Therefore, the UV curing agent 125 is coated to cover the four vertices of the bottom part 123a of the receiving part 123 in the pouch case 120, which are stressed (e.g., most severely stressed) and are stretched (e.g., most stretched) during the pressing process. The UV curing agent 125 is coated to cover the four vertices of the bottom part 123a of the receiving part 123, which are prone to (e.g., highly liable to) crack during the pressing process, thereby sealing interior parts of the pouch body 121 even when cracks are generated at the four vertices. The UV curing agent 125 is cured by UV irradiation to be adhered to and fixed to the interior parts of the pouch body 121.

In the pouch case 120 having the UV curing agent 125 cured therein, the electrode assembly 110 is mounted in an inner space of the receiving part 123 of the pouch body 121, edges of the planar part 124 of the pouch body 121 and edges of the substantially plate-shaped pouch cover 122 are brought into close contact with each other and sealed to each other by, for example, thermal welding. For example, the pouch case 120 is sealed by welding the edges of the planar part 124 of the pouch body 121 and the pouch cover 122. In an embodiment, an electrolytic solution is contained within the pouch case 120. In addition, the first electrode tab 114 and the second electrode tab 115 of the electrode assembly 110 extend and protrude to the outside of the pouch case 120 through the planar part 124 of the pouch body 121.

The planar part 124 corresponds to a portion at which the pouch body 121 and the pouch cover 122 are welded to each other and which planarly extends at a length (e.g., a predetermined length).

In addition, the UV curing agent 125 coated on inner vertices of the receiving part 123 of the pouch body 121 may make contact with the electrode assembly 110.

The pouch body 121 has a multi-layered thin film structure including a thin metal film and one or two insulating layers formed on one or two surfaces of the thin metal film. Similar to the pouch body 121, the pouch cover 122 may also have a multi-layered thin film structure.

In the pouch battery 100, according to embodiments of the present invention, the UV curing agent 125 is coated to cover the inner vertices of the pouch body 121, which are prone to crack during a pressing process, thereby sealing interior parts of the pouch case 120 even when the cracks are generated at inner corners (e.g., edges) of the pouch body 121 as a result of a formation process. Therefore, the safety of the pouch battery 100 can be improved by preventing moisture from infiltrating into the battery and preventing an electrolytic solution from leaking out.

Figure 3:
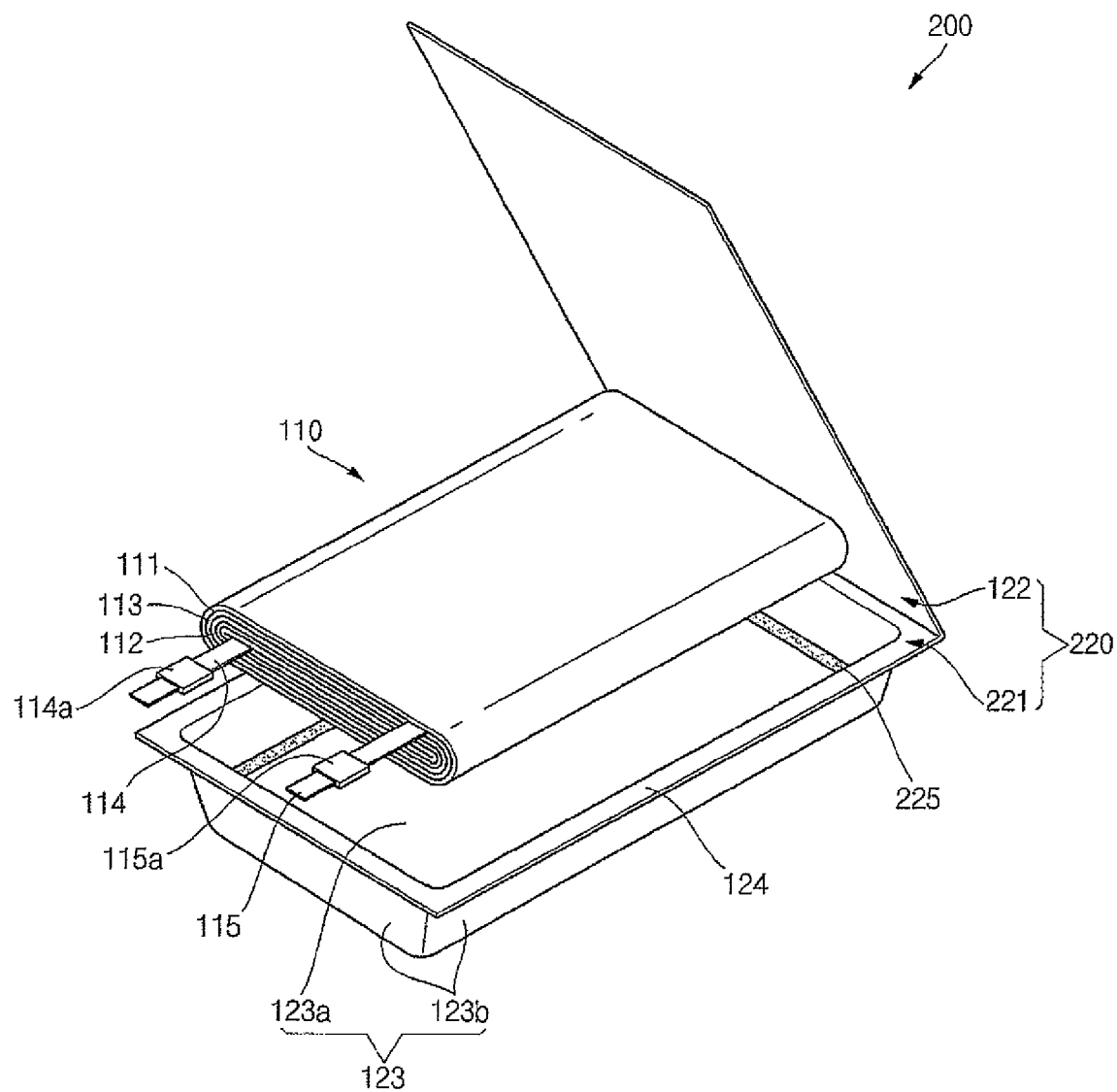
FIG. 3 is an exploded perspective view of a pouch battery, according to an example embodiment of the present.
Figure 4A:
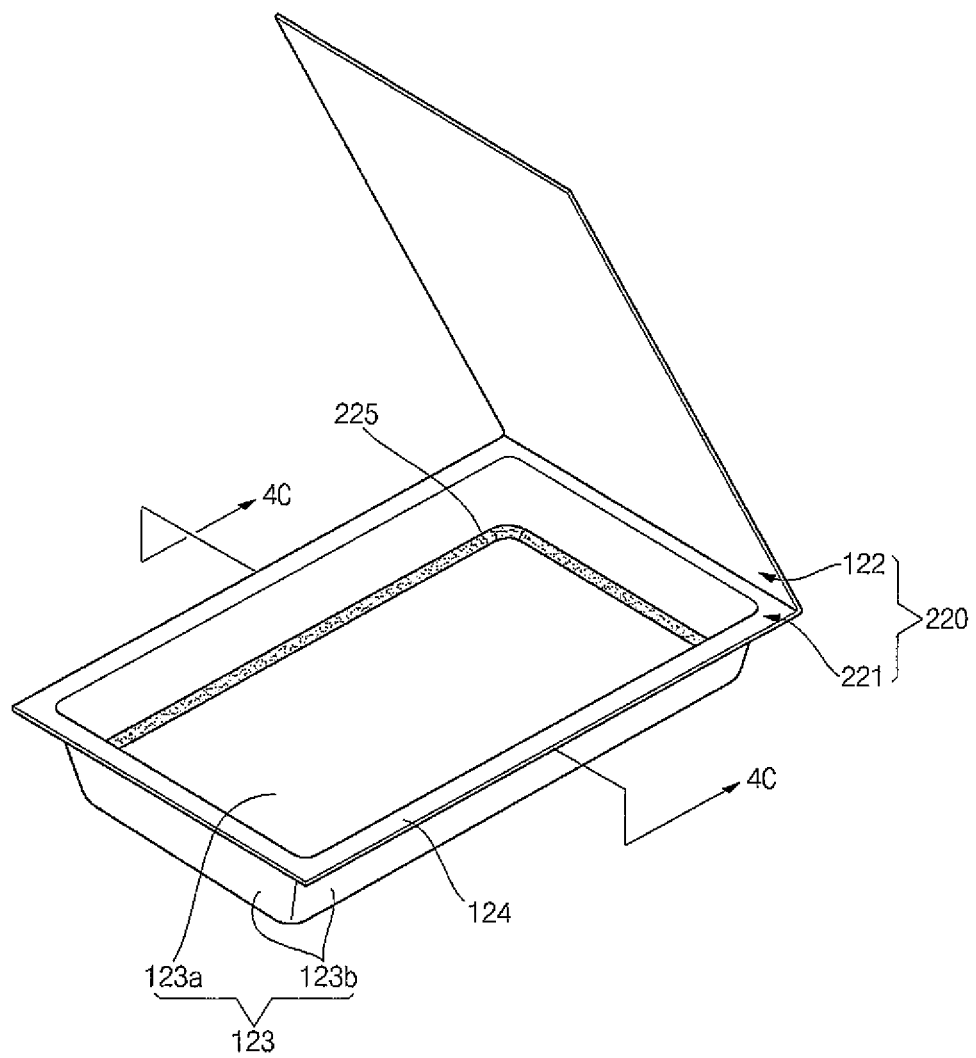
FIGS. 4A to 4C are a perspective view illustrating only a pouch case and a plan view and a cross-sectional view illustrating a pouch body of the pouch battery shown in FIG. 3, according to an example embodiment of the present invention.
Figure 4B:
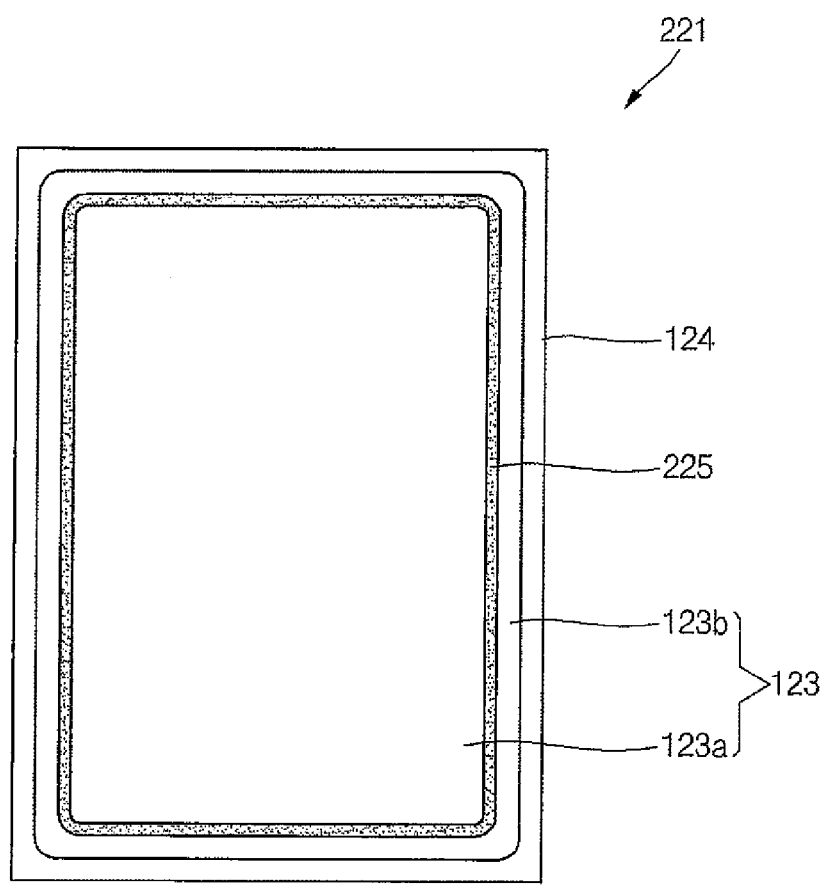
Figure 4C:
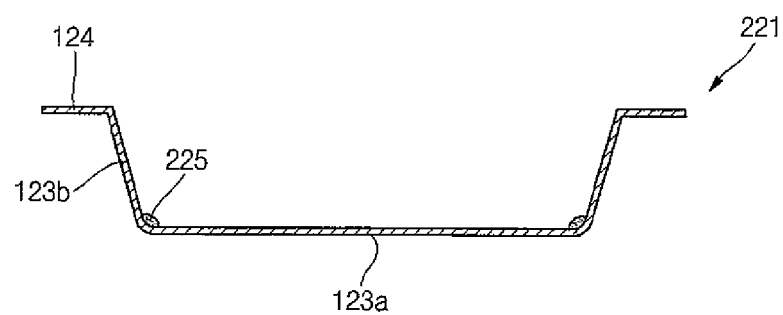

FIG. 3 is an exploded perspective view of a pouch battery, according to an example embodiment of the present invention, and FIGS. 4A to 4C are a perspective view illustrating only a pouch case and a plan view and a cross-sectional view illustrating a pouch body of the pouch battery shown in FIG. 3, according to an example embodiment of the present invention.

The pouch battery 200 shown in FIGS. 3 and 4A to 4C includes an electrode assembly 110, and a pouch case 220 including a pouch body 221 and a pouch cover 122. A UV curing agent 225 is coated on inner corners of a receiving part 123 of a pouch body 221. Configurations of the electrode assembly 110 of the pouch battery 200 and the pouch case 220 are substantially the same as those of the pouch battery 100 shown in FIGS. 1A and 1B, except that a portion of the pouch case 220 coated with the UV curing agent 225 is different from that of the pouch battery 100 shown in FIGS. 1A and 1B. Thus, the following description will focus on the UV curing agent 225 coated on the pouch body 221 of the pouch case 220.

The UV curing agent 225 is coated to cover the inner corners of the pouch body 221 of the pouch case 220. For example, the UV curing agent 225 is coated to entirely cover the inner corners (e.g., along inner edges or an inner periphery) of the pouch body 221 of the pouch case 220 where a bottom part 123a and a lateral part 123b meet (e.g., are connected to each other) in the receiving part 123 of the pouch body 221. The UV curing agent 225 is coated to entirely cover the outer periphery of the bottom part 123a, that is, the edge of the bottom part 123a, inside the receiving part 123. The UV curing agent 225 is coated for the purpose of preventing an electrolytic solution from leaking from the pouch battery 200 due to cracks generated by the stress applied during the pressing process. Therefore, the UV curing agent 225 is coated to cover the four corners (e.g., edges) of the bottom part 123a in the pouch case 220 where the bottom part 123a and the lateral part 123b are connected to each other, and where the receiving part 123 is stressed (e.g., most severely stressed) and is most stretched during the pressing process. The UV curing agent 225 is coated to cover the inner four corners of the bottom part 123a of the receiving part 123, which are prone to (e.g., highly liable to) crack, thereby sealing interior parts of the pouch body 221 even when cracks are generated at the four vertices. The UV curing agent 225 is cured by UV irradiation so that the curing agent 225 adheres to and is fixed to the interior parts of the pouch body 221.

In addition, the UV curing agent 225 coated on the inner four corners of the receiving part 223 of the pouch body 221 may make contact with the electrode assembly 110 when the electrode assembly 110 is mounted in an inner space of the receiving part 123.

In the pouch battery 200, according to embodiments of the present invention, the UV curing agent 225 is coated to cover inner corners of the pouch body 121, which are prone to crack during a pressing process, thereby sealing interior parts of the pouch case 120 even when the cracks are generated at the inner corners (e.g., edges) of the pouch body 121 in a formation process. Therefore, the safety of the pouch battery 100 can be improved by preventing moisture from infiltrating into the battery and preventing an electrolytic solution from leaking out.

Figure 5A:
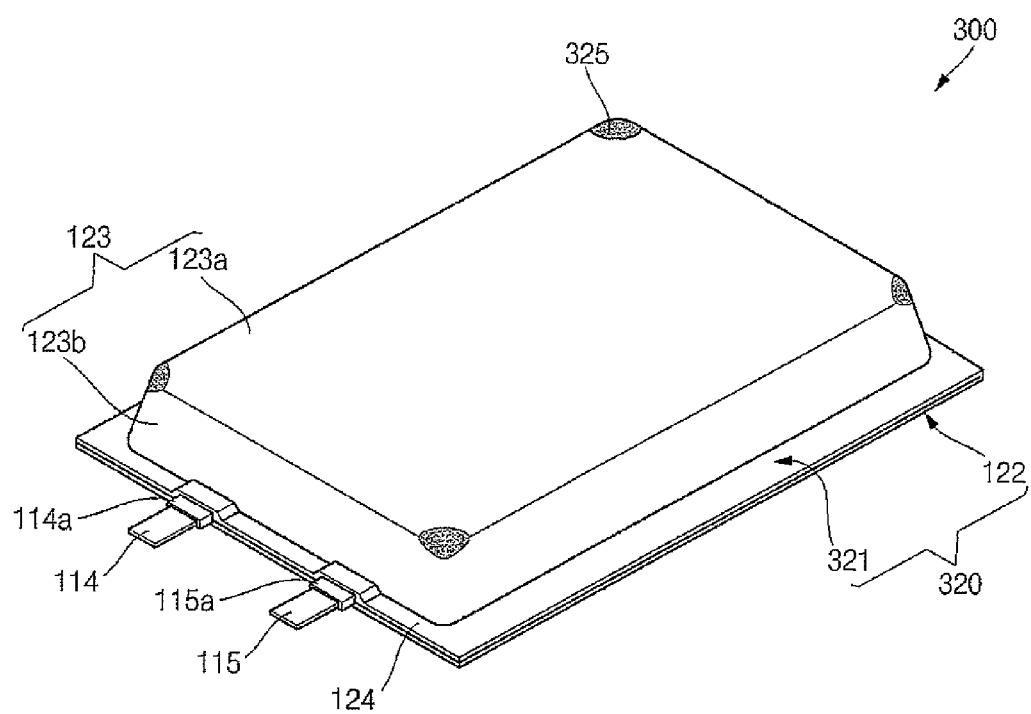
FIGS. 5A and 5B are a perspective view of a pouch battery and an exploded perspective view thereof viewed from a different side, according to an example embodiment of the present invention.
Figure 5B:
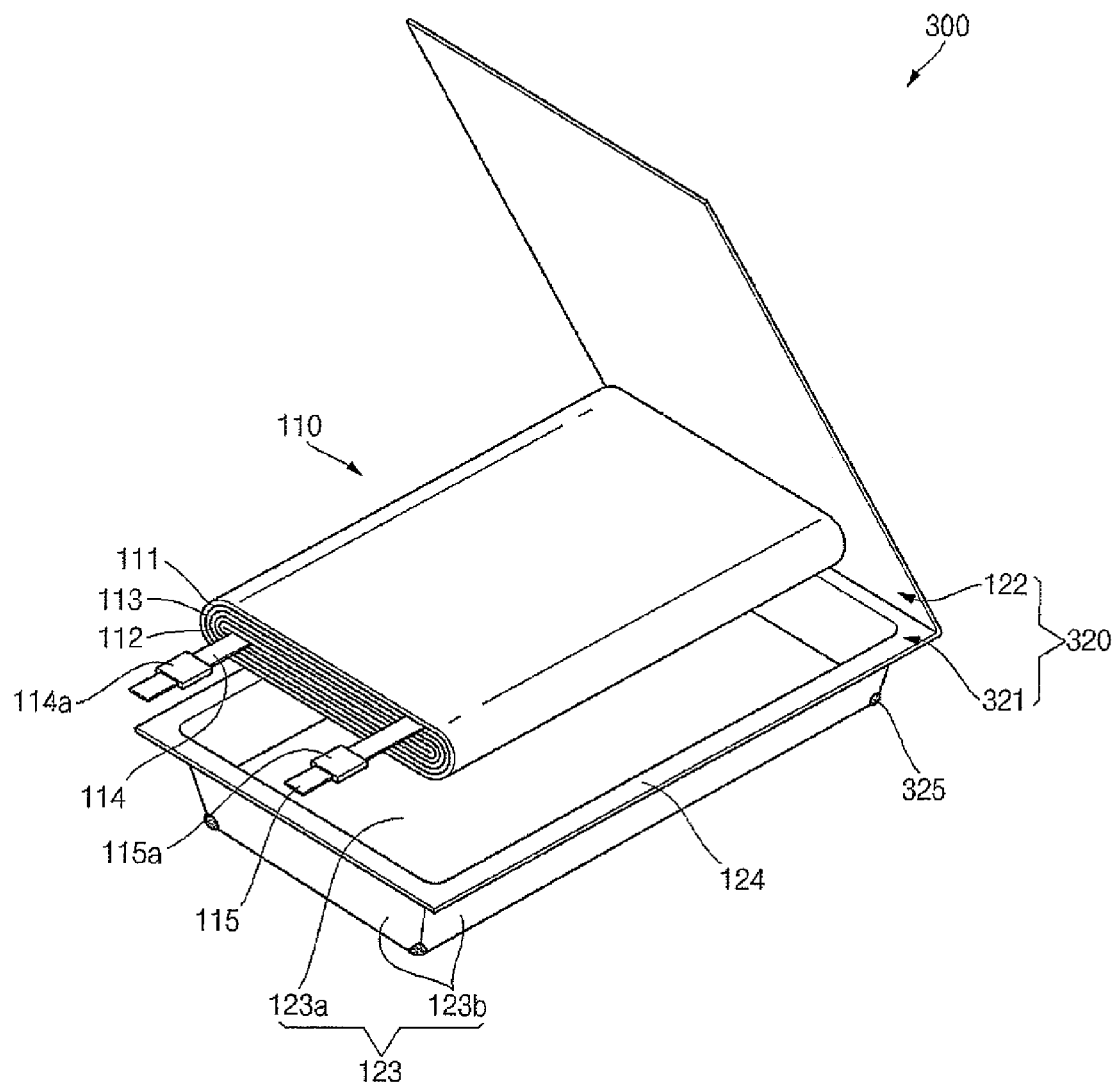

FIGS. 5A and 5B are a perspective view of a pouch battery and an exploded perspective view thereof viewed from a different side, according to an example embodiment of the present invention. FIG. 5A is a perspective view of the pouch battery 300, viewed from a side of a pouch body 321 of a pouch case 320, and FIG. 5B is an exploded perspective view of the pouch battery 100, viewed from a side of a pouch cover 122 of the pouch case 320, as opposed to a direction in which the pouch battery 300 is viewed from the side of the pouch body 321. The pouch battery 300 shown in FIGS. 5A and 5B includes an electrode assembly 110 and the pouch case 320 including the pouch body 321 and the pouch cover 122. A UV curing agent 325 is coated on outer vertices of the pouch body 321. Configurations of the electrode assembly 110 of the pouch battery 300 and the pouch case 320 are substantially the same as those of the pouch battery 100 shown in FIGS. 1A and 1B, except that a portion of the pouch case 320 coated with the UV curing agent 325 is different from that of the pouch battery 100 shown in FIGS. 1A and 1B. Thus, the following description will focus on the UV curing agent 325 coated on the pouch body 321 of the pouch case 320.

The UV curing agent 325 is coated to cover outer vertices of the pouch body 321 in the pouch case 320. For example, the UV curing agent 325 is coated to entirely cover the outer vertices of the bottom part 123a, where the bottom part 123a and corners of the lateral part 123b meet (e.g., are coupled or connected to each other) in the receiving part 123 of the pouch body 321. The UV curing agent 325 is coated for the purpose of preventing an electrolytic solution from leaking from the pouch battery 300 due to cracks generated by the stress applied during the pressing process. Therefore, the UV curing agent 325 is coated to cover the four vertices of the bottom part 123a of the receiving part 123 in the pouch case 320 where the bottom part 123a and the corners of the lateral part 123b are connected to each other, and which are stressed (e.g., most severely stressed) and are most stretched in the pouch case 320 during the pressing process. The UV curing agent 325 is coated to cover the four outer vertices of the receiving part 123, which are prone to crack during the pressing process, thereby sealing interior parts of the pouch body 321 even when cracks are generated at the four vertices. The UV curing agent 325 is cured by UV irradiation so that the UV curing agent 325 adheres to and is fixed to the interior parts of the pouch body 321.

Because the UV curing agent 325 is coated on the outer surface of the pouch case 320, it may be coated after forming the pouch case 320 using a pressing process. In one embodiment, the UV curing agent 325 may be coated after mounting the electrode assembly 110 in the inner space of the receiving part 123, and bonding and sealing the pouch case 320.

For example, in the pouch battery 300, the UV curing agent 325 is coated to cover the outer vertices of the receiving part 123 of the pouch body 321, which are prone to (e.g., highly liable to) crack during the pressing process, thereby sealing interior parts of the pouch case 320 even when cracks are generated at the four vertices of the pouch body 321. Therefore, the safety of the pouch battery 300 can be improved by preventing moisture from infiltrating into the battery and preventing an electrolytic solution from leaking out.

Figure 6A:
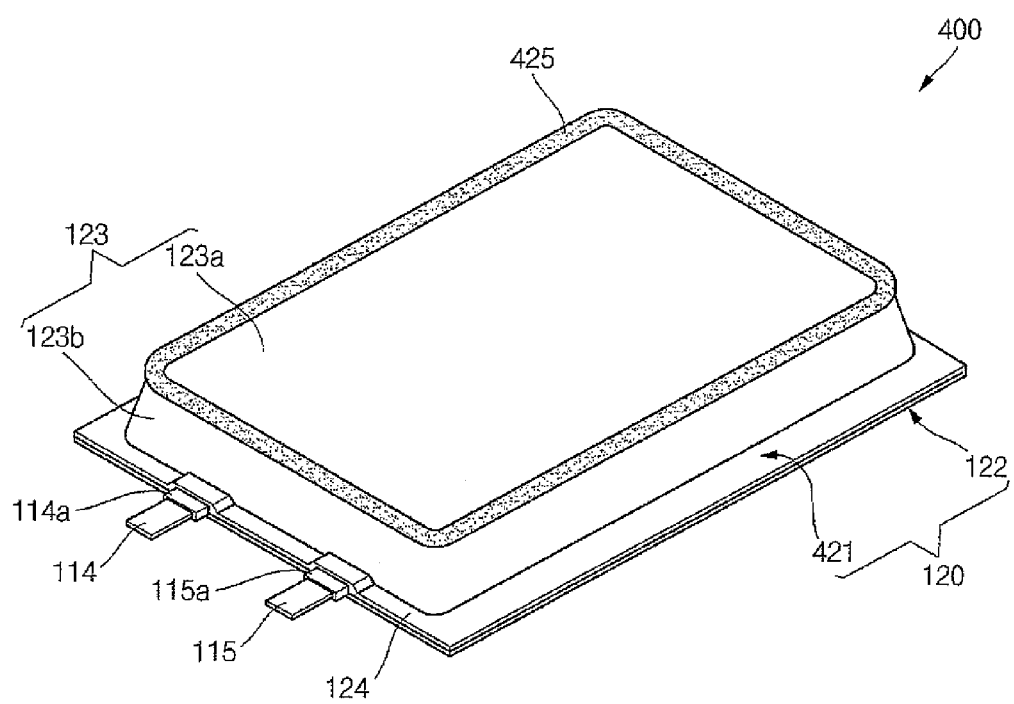
FIGS. 6A and 6B are a perspective view of a pouch battery and an exploded perspective view thereof viewed from a different side, according to an example embodiment of the present invention.
Figure 6B:
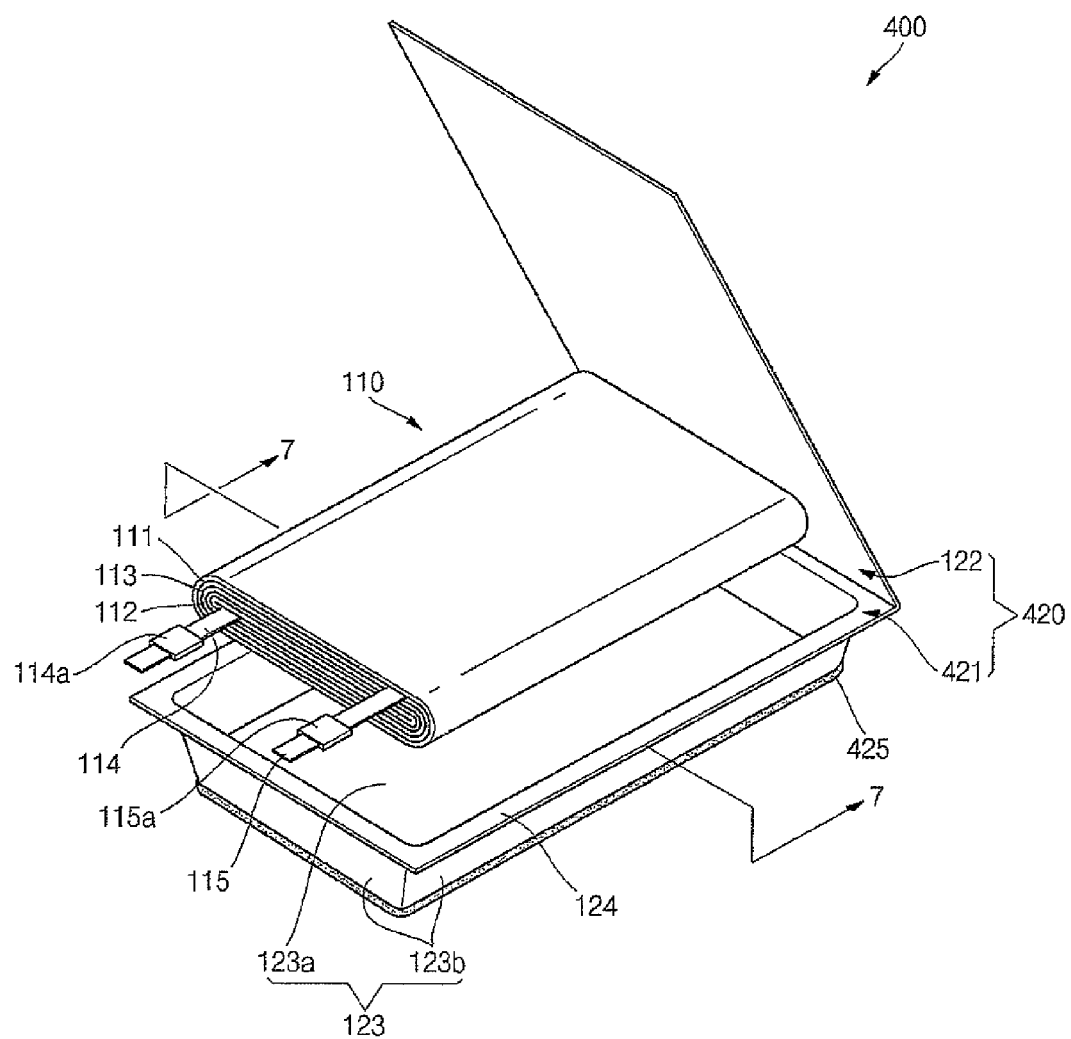

FIGS. 6A and 6B are a perspective view of a pouch battery and an exploded perspective view thereof viewed from a different side, according to an example embodiment of the present invention.

Figure 7:
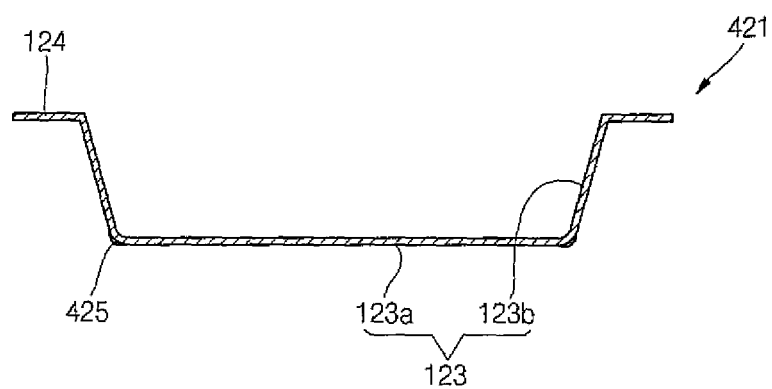
FIG. 7 is a cross-sectional view of a pouch body of the pouch battery shown in FIG. 6B, taken along the line 7-7 of FIG. 6B, according to an example embodiment of the present invention.

FIG. 6A is a perspective view of the pouch battery 400, viewed from a side of a pouch body 421 of a pouch case 420, and FIG. 6B is an exploded perspective view of the pouch battery 400, viewed from a side of a pouch cover 422 of the pouch case 420, as opposed to a direction in which the pouch battery 400 is viewed from the side of the pouch body 421. FIG. 7 is a cross-sectional view of a pouch body of the pouch battery shown in FIG. 6B, taken along the line 7-7 of FIG. 6B, according to an example embodiment of the present invention.

The pouch battery 400 shown in FIGS. 6A and 6B includes an electrode assembly 110 and the pouch case 420 including the pouch body 421 and the pouch cover 122. A UV curing agent 425 is coated on outer corners of the pouch body 421. Configurations of the electrode assembly 110 of the pouch battery 400 and the pouch case 420 are substantially the same as those of the pouch battery 100 shown in FIGS. 1A and 1B, except that a portion of the pouch case 420 coated with the UV curing agent 425 is different from that of the pouch battery 100 shown in FIGS. 1A and 1B. Thus, the following description will focus on the UV curing agent 425 coated on the pouch body 421 of the pouch case 420.

The UV curing agent 425 is coated to cover outer corners of the pouch body 421 of the pouch case 420. The UV curing agent 425 is coated to entirely cover the outer corners (e.g., along edges or a periphery) of the bottom part 123a where a bottom part 123a and a lateral part 123b meet (e.g., are coupled to or connected to each other) in the receiving part 123 of the pouch body 421. The UV curing agent 425 is coated for the purpose of preventing an electrolytic solution from leaking from the pouch battery 400 due to cracks generated by the stress applied during the pressing process. Therefore, the UV curing agent 425 is coated to cover the corners (e.g., edges) of the bottom part 123a in the pouch case 420 where the bottom part 123a and the lateral part 123b are connected to each other, and where the receiving part 123 is stressed (e.g., most severely stressed) and is most stretched during the pressing process. The UV curing agent 425 is coated to cover the outer corners of the receiving part 123, which are prone to crack, thereby sealing interior parts of the pouch body 421 even when cracks are generated at the four vertices. The UV curing agent 425 is cured by UV irradiation so that the UV curing agent 425 adheres to and is fixed to the interior parts of the pouch body 421.

Because the UV curing agent 425 is coated on the outer surface of the pouch case 420, it may be coated after forming the pouch case 420 using a pressing process. In one embodiment, the UV curing agent 425 may be coated after mounting the electrode assembly 110 in an inner space of the receiving part 123, and bonding and sealing the pouch case 420.

For example, in the pouch battery 400, the UV curing agent 425 is coated to cover the outer corners of the receiving part 123 of the pouch body 421, which are prone to crack, thereby sealing interior parts of the pouch body 421 even when cracks are generated at the vertices of the pouch body 421. Therefore, the safety of the pouch battery 400 can be improved by preventing moisture from infiltrating into the battery and preventing an electrolytic solution from leaking out.

Figure 8:
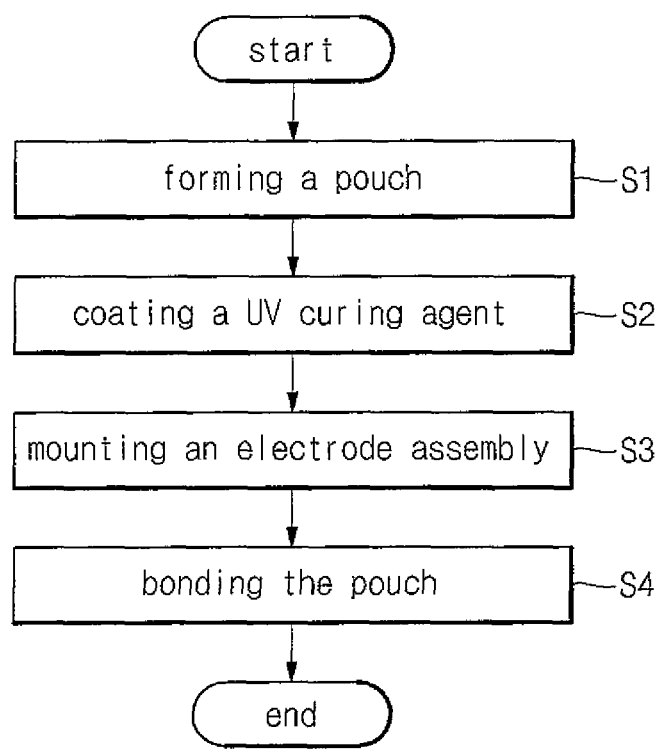
FIG. 8 is a flow diagram illustrating a manufacturing method of the pouch battery shown in FIGS. 1A and 1B, according to an example embodiment of the present invention.

FIG. 8 is a flow diagram illustrating a manufacturing method of the pouch battery shown in FIGS. 1A and 1B, according to an example embodiment of the present invention. Hereinafter, the pouch battery manufacturing method shown in FIG. 8 will be described with reference to FIGS. 1A, 1B, 2A, and 2B.

As shown in FIG. 8, the pouch battery manufacturing method includes forming a pouch (S1), coating a UV curing agent (S2), mounting an electrode assembly (S3), and bonding the pouch (S4).

In the forming of the pouch (S1), the receiving part 123 that is a groove formed in a rectangular pouch film using a pressing process is formed and folded, thereby forming the pouch case 120. In one embodiment, in the forming of the pouch (S1), receiving part 123 having a depth (e.g., a predetermined depth) is formed by the pressing process in which a pressure is applied to the rectangular pouch film using a mold shaped to correspond to the receiving part 123. The receiving part 123 includes a bottom part 123a that is a planar plate, and a lateral part 123b formed as a single body and extending a height (e.g., a predetermined height) in a direction generally perpendicular to the bottom part 123a from four corners (e.g., edges) of the bottom part 123a. In addition, the pouch body 121 may further include a planar part 124 bent from an edge (e.g., an end) of the lateral part 123b and extending along edges of the receiving part 123 to be parallel to the bottom part 123a. Thus, in the forming of the pouch (S1), the receiving part 123 is formed by applying a pressure to the substantially planar rectangular pouch film from a direction substantially perpendicular to the planar part 124, thereby forming the pouch case 120.

The rectangular pouch film may include the pouch body 121 and the pouch cover 122, which are folded along a lengthwise direction of one of its sides. In one embodiment, the pouch body 121 and the pouch cover 122 of the pouch case 120 have the same planar size.

According to an example embodiment, in the coating of the UV curing agent (S2), the UV curing agent 125 is coated on vertices of the bottom part 123a inside the receiving part 123. The UV curing agent 125 may be coated on or injected into interior parts of the receiving part 123 where the bottom part 123a and corners of the lateral part 123b meet (e.g., are coupled or connected), so as to entirely cover the vertices of the bottom part 123a. In addition, the UV curing agent 125 is coated and then cured by UV irradiation to then adhere to and be fixed to the interior parts of the receiving part 123.

In one embodiment, as shown in FIGS. 4A and 4B, the UV curing agent 225 may be coated on inner corners (e.g., inner edges) of the receiving part 123 where the bottom part 123a and the lateral part 123b are connected to each other in the receiving part 123. In another embodiment, as shown in FIGS. 5A and 5B, the UV curing agent 325 may be coated on vertices of the bottom part 123a outside the receiving part 123. In another embodiment, as shown in FIGS. 6A and 6B, the UV curing agent 425 may be coated on corners (e.g., along edges or a periphery) of the receiving part 123 where the bottom part 123a and the lateral part 123b meet (e.g., are coupled to or connected to each other) outside the receiving part 123.

In the mounting of the electrode assembly (S3), the electrode assembly 110 is mounted in the inner space of the receiving part 123 of the pouch case 120 coated with the UV curing agent 125. The electrode assembly 110 is received in the inner space of the receiving part 123 so as not to protrude to the outside of the receiving part 123. For example, a height of the lateral part 123b of the receiving part 123 is greater than a thickness of the electrode assembly 110 (i.e., a distance between wide wall surfaces).

In the bonding of the pouch (S4), the pouch body 121 having the electrode assembly 110 accommodated (e.g., received) therein and the pouch cover 122 are bonded and sealed. For example, in the bonding of the pouch (S4), the planar part 124 of the pouch body 121 and edges of the substantially plate-shaped pouch cover 122 are brought into contact with each other and bonded to each other by thermally welding. In this example, not only the electrode assembly 110 but an electrolytic solution may be received in the inner space of the receiving part 123 of the pouch case 120.

Figure 9:
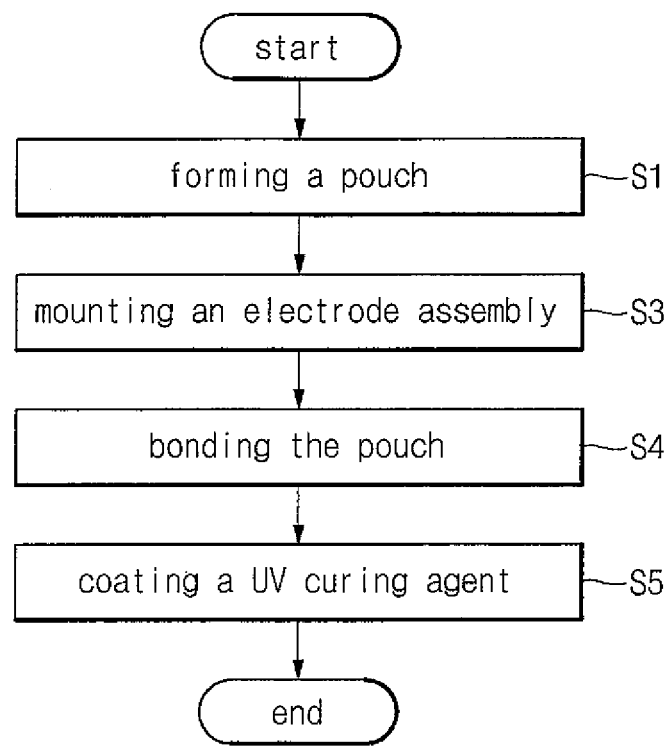
FIG. 9 is a flow diagram illustrating a manufacturing method of the pouch battery shown in FIGS. 5A and 5B, according to an example embodiment of the present invention.

FIG. 9 is a flow diagram illustrating a manufacturing method of the pouch battery shown in FIGS. 5A and 5B, according to an example embodiment of the present invention. Hereinafter, the pouch battery manufacturing method shown in FIG. 9 will be described with reference to FIGS. 5A and 5B.

As shown in FIG. 9, the pouch battery manufacturing method includes forming a pouch (S1), mounting an electrode assembly (S3), bonding the pouch (S4) and coating a UV curing agent (S5).

The forming of the pouch (S1), the mounting of the electrode assembly (S3) and the bonding of the pouch (S4) shown in FIG. 9 are the similar to (e.g., same as) those of FIG. 8. Thus, the following description will focus on the coating of the UV curing agent (S5).

According to an example embodiment, in the coating of the UV curing agent (S5), the UV curing agent 325 is coated on outer vertices of the bottom part 123a of the receiving part 123 in the pouch body 321 of the pouch case 320. The UV curing agent 325 may be coated on or injected onto exterior part 123a of the receiving part 123 where the bottom part 123a and corners of the lateral part 123b meet (e.g., are coupled or connected), so as to entirely cover the vertices of the bottom part 123a. In addition, the UV curing agent 325 is coated and then cured by UV irradiation to then adhere to and be fixed to the outer vertices of the receiving part 123.

In one embodiment, as shown in FIGS. 6A and 6B, the UV curing agent 425 may also be coated on outer corners where the bottom part 123a and the lateral part 123b are connected to each other in the receiving part 123. Thus, the UV curing agent 225 may be coated on outer vertices or corners of the receiving part 123 in the pouch case 120 bonded to the electrode assembly 110 after the electrode assembly 110 is accommodated (e.g., received) in the pouch case 120.

Although the pouch battery and the manufacturing method thereof, according to exemplary embodiments of the present invention, have been described in detail hereinabove, it should be understood that many variations and modifications of the basic inventive concept herein described, which may become apparent to those skilled in the art, will still fall within the spirit and scope of the exemplary embodiments of the present invention as defined by the appended claims and equivalents thereof.

What is claimed is:

1. A pouch battery comprising:
an electrode assembly; and
a pouch case comprising a receiving part accommodating the electrode assembly,
wherein corners or vertices of the receiving part are coated with a UV curing agent while other portions of the receiving part remain exposed with respect to the UV curing agent.

2. The pouch battery of claim 1, wherein the pouch case comprises:
a pouch body comprising the receiving part accommodating the electrode assembly therein and having one open side; and
a pouch cover having a generally plate shape and coupled to one side of the pouch body to cover the receiving part of the pouch body.

3. The pouch battery of claim 2, wherein the UV curing agent is coated on inner corners of the receiving part.

4. The pouch battery of claim 2, wherein the UV curing agent is coated on outer corners of the receiving part.

5. The pouch battery of claim 2, wherein the UV curing agent is coated on outer vertices of the receiving part.

6. The pouch battery of claim 2, wherein the pouch body comprises the receiving part and a planar part, the receiving part having a bottom part that is a rectangular planar plate and lateral parts extending from corners of the bottom part in a direction generally perpendicular to the bottom part, and the planar part being bent from the lateral parts of the receiving part and extends outward from the receiving part in parallel with the bottom part.

7. The pouch battery of claim 6, wherein the UV curing agent is coated on vertices of the bottom part inside the receiving part.

8. The pouch battery of claim 6, wherein the pouch case is configured such that the planar part of the pouch body and the pouch cover are bonded to each other, and positive and negative electrode tabs of the electrode assembly are exposed to the outside.

9. A manufacturing method of a pouch battery, the manufacturing method comprising:
forming a pouch case by forming a receiving part that is a groove formed in a rectangular pouch film by a pressing process;
coating a UV curing agent on corners or vertices of the receiving part while other portions of the receiving part remain exposed with respect to the UV curing agent;
mounting an electrode assembly in the receiving part of the pouch case; and
sealing the pouch case accommodating the electrode assembly.

10. The manufacturing method of claim 9, wherein in the coating of the UV curing agent, the UV curing agent is coated on inner corners of the receiving part.

11. The manufacturing method of claim 9, wherein in the coating of the UV curing agent, the UV curing agent is coated on outer corners of the receiving part.

12. The manufacturing method of claim 9, wherein in the coating of the UV curing agent, the UV curing agent is coated on inner vertices of the receiving part.

13. The manufacturing method of claim 9, wherein in the coating of the UV curing agent, the UV curing agent is coated on outer vertices of the receiving part.

14. The manufacturing method of claim 11, wherein the pouch case comprises:
a pouch body comprising the receiving part and a planar part, the receiving part having a bottom part that is a rectangular planar plate and lateral parts extending from corners of the bottom part in a direction generally perpendicular to the bottom part, and the planar part being bent from the lateral parts of the receiving part and extending outward from the receiving part in parallel with the bottom part; and
a pouch cover having a generally plate shape and coupled to one side of the pouch body to cover the receiving part of the pouch body.

15. A manufacturing method of a pouch battery, the manufacturing method comprising:
forming a pouch case by forming a receiving part that is a groove formed in a rectangular pouch film by a pressing process;
mounting an electrode assembly in the receiving part of the pouch case;
sealing the pouch case accommodating the electrode assembly; and
coating a UV curing agent on outer corners or vertices of the receiving part while other portions of the receiving part remain exposed with respect to the UV curing agent.

* * * * *